(12) United States Patent
Vladi

(10) Patent No.: US 11,080,687 B2
(45) Date of Patent: Aug. 3, 2021

(54) SYSTEMS AND METHODS FOR BLOCKCHAIN-BASED TRANSACTION SETTLEMENT

(71) Applicant: BlocX LLC, New York, NY (US)

(72) Inventor: Anna Vladi, Glen Rock, NJ (US)

(73) Assignee: BLOCX LLC, New York, NY (US)

( * ) Notice: Subject to any disclaimer, the term of this patent is extended or adjusted under 35 U.S.C. 154(b) by 0 days.

(21) Appl. No.: 16/930,168

(22) Filed: Jul. 15, 2020

(65) Prior Publication Data
US 2021/0019737 A1 Jan. 21, 2021

Related U.S. Application Data

(60) Provisional application No. 62/874,052, filed on Jul. 15, 2019.

(51) Int. Cl.
*G06Q 20/36* (2012.01)
*G06Q 20/38* (2012.01)
(Continued)

(52) U.S. Cl.
CPC ....... *G06Q 20/3674* (2013.01); *G06Q 20/223* (2013.01); *G06Q 20/381* (2013.01); *G06Q 20/389* (2013.01); *G06Q 20/3829* (2013.01); *H04L 9/0637* (2013.01); *H04L 9/3218* (2013.01); *H04L 2209/38* (2013.01); *H04L 2209/56* (2013.01)

(58) Field of Classification Search
CPC .......... G06Q 20/3674; G06Q 20/3829; G06Q 20/00–425; H04L 9/3218; H04L 9/0637; H04L 2209/56; H04L 2209/38
See application file for complete search history.

(56) References Cited

U.S. PATENT DOCUMENTS 5,453,601 A * 9/1995 Rosen ................ G06Q 20/3678
705/65
6,327,578 B1 * 12/2001 Linehan ................ G06Q 20/02
705/65

(Continued)

OTHER PUBLICATIONS

Cerescoin, "CeresCoin—Blockchain Transaction Network for the Legal Cannabis Industry," published at least as early as Jan. 18, 2019, www.web.archive.org/web/20190118163732/https://www.cerescoin.io/, last accessed Oct. 15, 2020.

*Primary Examiner* — John W Hayes
*Assistant Examiner* — Taylor S Rak
(74) *Attorney, Agent, or Firm* — Waller Lansden Dortch & Davis, LLP; Blake M. Bernard; Christoper T. McNeill

(57) ABSTRACT

A system may include a blockchain network, a trust entity, and multiple user devices. A smart contract of the blockchain network may be configured to receive data from the trust entity and transfer digital stable tokens to a first user's cryptocurrency wallet. The first user may generate a blockchain transaction on the blockchain network in order to transfer some digital stable tokens to a second user. The second user may cash out some of the digital stable tokens via a smart contract of the blockchain network. The smart contract may send an instruction to the trust entity's computing system to transfer fiat currency into a financial account of the second user. A token cross-chain bridge may also facilitate the exchange of cryptocurrency for digital stable tokens.

5 Claims, 8 Drawing Sheets

(51) Int. Cl.
  *H04L 9/06* (2006.01)
  *H04L 9/32* (2006.01)
  *G06Q 20/22* (2012.01)

(56) References Cited

U.S. PATENT DOCUMENTS

| | | | |
|---|---|---|---|
| 6,539,364 B2 * | 3/2003 | Moribatake | G06Q 20/02 |
| | | | 705/1.1 |
| 10,310,824 B2 * | 6/2019 | Eksten | G06F 9/44521 |
| 10,540,654 B1 * | 1/2020 | James | G06Q 20/223 |
| 2013/0317984 A1 | 11/2013 | O'Leary et al. | |
| 2016/0330034 A1 * | 11/2016 | Back | H04L 9/3255 |
| 2019/0287175 A1 * | 9/2019 | Hill | G06Q 40/04 |
| 2020/0250590 A1 * | 8/2020 | Augustine | G06F 9/44521 |

* cited by examiner

SYSTEMS AND METHODS FOR BLOCKCHAIN-BASED TRANSACTION SETTLEMENT

CROSS-REFERENCES TO RELATED APPLICATIONS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

This application claims priority to U.S. Provisional Patent Application No. 62/874,052, entitled "System, Apparatus, and Business Method For Payments with Stable Token Settlement," filed Jul. 15, 2019, the entirety of which is incorporated by reference.

BACKGROUND OF THE INVENTION

In a conventional payment transaction settlement process, a consumer can purchase goods or services from a merchant using a debit card or a credit card. The card payment is processed through a complex system of intermediaries, which typically includes one or more banks and a card payment network. With this existing structure, funds involved in the payment transaction are not immediately available to a merchant even though the merchant has accepted payment from the consumer. Instead, the merchant must wait for the card transaction to clear and settle with the various intermediaries, which conventionally includes the merchant receiving an automated clearing house (ACH) transfer with the funds from the bank that issued the consumer's card.

This conventional transaction settlement process has several inherent problems. First, as mentioned above, the funds of the card payment transaction are not immediately available to the merchant. The merchant must wait for the transaction to clear and settle, which may take up to several days. Second, card transactions often involve the intermediaries sending large amounts of data to each other, which presents a cybersecurity risk, requires a large amount of bandwidth, and can slow down the transaction settlement processing speeds and transaction rates for the payment to be fully processed. Third, some people or entities do not have access to the banking infrastructure necessary to make or accept card payments.

In order to avoid the problems associated with card payments, some merchants have begun to accept cryptocurrencies, as a form of payment. Cryptocurrencies such as Bitcoin or another type of cryptocurrency can be tracked on a blockchain. However, accepting cryptocurrency payments has its own challenges. First, cryptocurrency prices are highly volatile, often fluctuating over a matter of days or even hours. This means that a merchant would need to constantly adjust its prices in order to receive a consistent amount of currency for the same goods or services. Second, cryptocurrency transactions may not be recorded on a blockchain for several hours, which may mean that the by the time a transaction has been completed, the price of the cryptocurrency may have dropped significantly. For example, a merchant may accept a cryptocurrency payment from a consumer when the price of the cryptocurrency is high, but by the time the merchant exchanges the cryptocurrency for fiat currency, the price of the cryptocurrency may have fallen. The converse is also true, which would result in unsatisfied customers who overpaid for the merchant's goods and services. Another challenge in using conventional cryptocurrencies is, in order to obtain cryptocurrency, an entity will often purchase the cryptocurrency from a cryptocurrency exchange. However, using a cryptocurrency exchange is difficult and adds a layer of complexity to the use of cryptocurrency.

What is needed, then, are improvements to systems and methods for transaction settlement.

DETAILED DESCRIPTION

Figure 1:
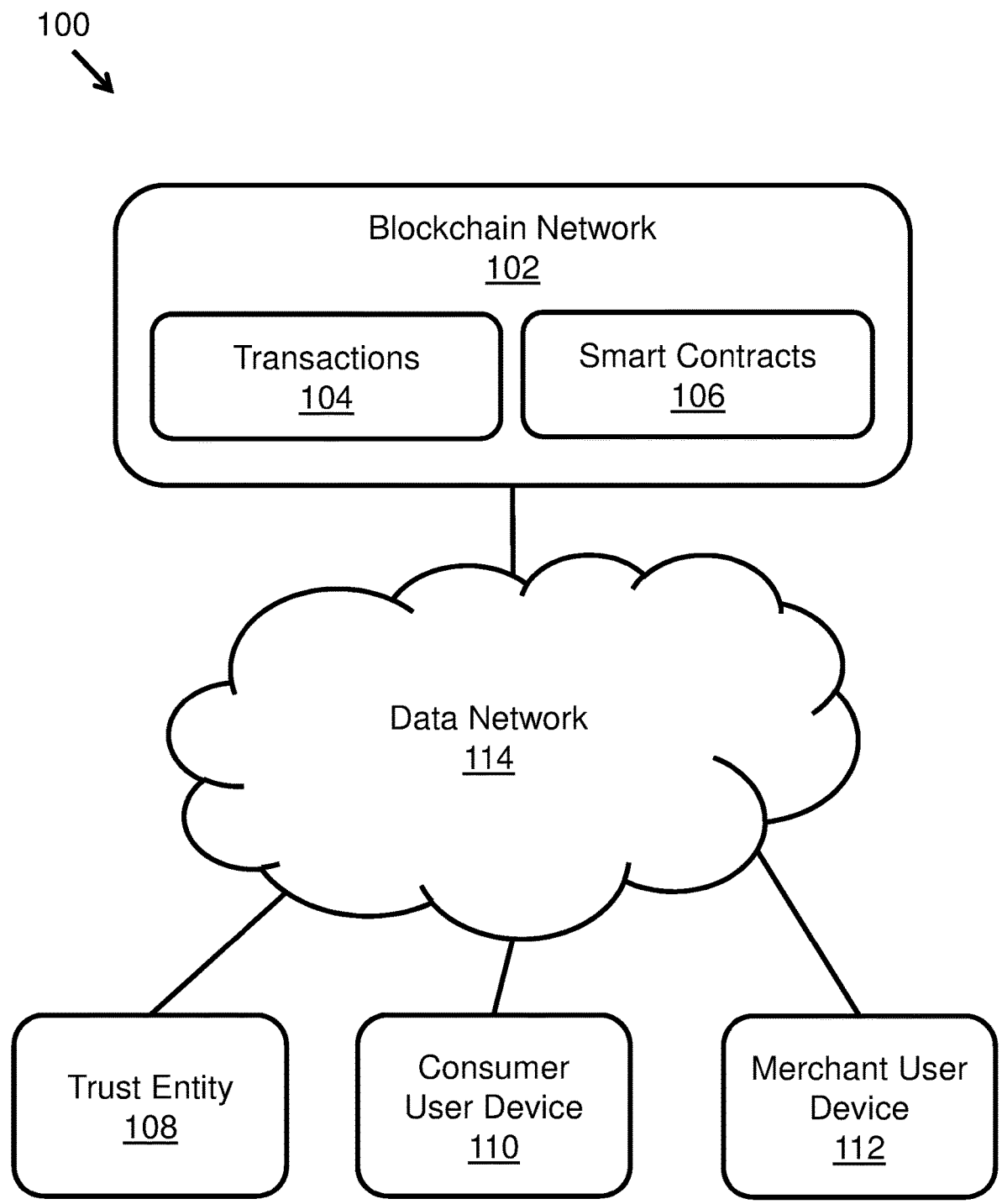
FIG. 1 is a schematic block diagram illustrating one embodiment of a system for blockchain-based transaction settlement.

Disclosed herein are systems and methods for blockchain-based transaction settlement. These systems and methods offer improvements to conventional payment transaction settlement processes and systems, some of which have been described above, thereby eliminating inherent complexity and associated economic and opportunity costs incurred by parties in conventional settlement networks. As a general overview of the systems and methods of the present invention, a consumer user may send fiat currency to a trust entity, such as a bank. The trust entity may notify a blockchain network to issue a corresponding amount of digital stable tokens to the consumer's cryptocurrency wallet. The consumer may spend its digital stable tokens, via a blockchain transaction, at a merchant who is willing to accept digital stable tokens as payment for goods or services. Later, the merchant user may send the digital stable tokens to a smart contract of the blockchain network, and the smart contract may automatically burn the received tokens and notify the trust entity to deposit a corresponding amount of fiat currency in an account owned by the merchant. In some embodiments, instead of sending fiat currency to the trust entity, the consumer user may exchange another type of cryptocurrency for the digital stable tokens using a token cross-chain bridge. The blockchain network may track transactions involving the issuance and exchange of the digital stable token. The digital stable token may be backed by a fiat currency, which may help prevent the risk of price fluctuations of the digital stable token since the digital stable token may be exchanged for fiat currency at a consistent price.

These systems and methods for blockchain-based transaction settlement can replace the conventional payment transaction settlement process and eliminate the risks associated with fluctuating cryptocurrency prices. For example, instead of using a debit or credit card, a user can generate a cryptocurrency wallet address via a quick response (QR) code and smart phone scanning capabilities and send payments via blockchain transactions. Instead of the clearing, interchange, and settlement processes of the card payment network that can take days to finalize, the merchant can send digital stable tokens to one or more smart contracts of the blockchain network, and the smart contracts can notify the trust entity to transfer the corresponding fiat currency, all occurring within seconds. Furthermore, the cost of the stable token transaction is significantly more economical and more efficient than traditional payment systems using legacy technology. Lastly, the present invention uses digital stable tokens to eliminate the risk associated with fluctuating cryptocurrency prices or values.

Some of the further benefits of the systems and methods for blockchain-based transaction settlement include security and fraud protection. The combination of smart phone devices with biometrics security, two-factor authentication, and the consensus mechanism of the blockchain network provide for cryptographically secure transactions. Furthermore, a token cross-chain bridge allows users to convert between the stable token and other cryptocurrencies within seconds instead of having to add an additional, time-consuming and potentially aggravating step of accessing or joining a cryptocurrency exchange, which may charge fees and may take several hours to finalize the exchange.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not necessarily all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "or" does not imply mutual exclusivity unless otherwise specified. The terms "first," "second," "third," and the like, when referring to objects, do not necessarily imply an order for those objects. Furthermore, in some cases, references to a first object and a second object may refer to the same object. In some of the claims, different claim sets may refer to the same object with different identifiers. For example, a first claim set may recite a "first object" and a second claim set may recite a "second object," however the first and second objects may include the same object.

As used herein, the term "computing device" may include a wide variety of electronic devices capable of computation. A computing device may include a server, such as an application server, a database server, or another type of server. A computing device may include a desktop computer, a laptop computer, a tablet computer, or a mobile phone. A computing device may include a wearable technology device such as a smartwatch, a virtual reality (VR) headset, an augmented reality (AR) device, or some other wearable device. In some embodiments, a computing device may include a virtual machine implemented on a physical computing device.

As used herein, the term "decentralized" means that at least a portion of information or functionality is not controlled by a single party. Instead, the decentralized information or functionality is distributed among several parties whose aggregate behavior affects the information or functionality. One example of a decentralized technology is a distributed ledger.

As used herein, the term "distributed ledger" may include a data storage of transactions replicated across and synchronized by multiple computing devices, called "nodes," in communication with each other. In some embodiments, the one or more nodes may be owned, controlled, or operated by a single party. The single party may include a person, an organization, a business, or some other type of entity. In other embodiments, the nodes may be owned, controlled, or operated by multiple parties, and at least a portion of the parties may be independent from each other (i.e., one party does not control another or exert a significant amount of influence directly on another). The nodes may synchronize the data of the distributed ledger, including which transactions are added to the ledger and in what order, using a consensus mechanism. The transactions may be cryptographically secured such that once a transaction is added to the distributed ledger, the transaction cannot be later modified. Basic encryption or cryptography principles—such a public key infrastructure, digital signatures, and other cryptographic technologies—underlie the application of distributed ledger technology. When a user adds a distributed ledger transaction, the user may digitally sign the transaction such that other parties can verify that the transaction did, in fact, originate from that user. One example implementation of a distributed ledger includes a blockchain.

As used herein, the term "blockchain" may include a distributed ledger whose transactions, as defined below, are gathered into blocks, and the nodes of the blockchain may append a block of transactions to the blocks that are already a part of the blockchain. A node or a client device may generate a transaction to be added to a blockchain. The node or client device may send the transaction to one or more nodes, and the one or more nodes may validate the transaction. Validating the transaction may include the node verifying the digital signature(s) of the transaction, verifying that the transaction does not involve any double-spending of a cryptocurrency, or verifying that the transaction's author has sufficient cryptocurrency to spend in the transaction. A node may assemble received transactions into a block of transactions and propose the blocks to other nodes. The other nodes of the same blockchain network may determine whether to add the block to the blockchain based on a consensus algorithm. In response to the nodes reaching consensus based on the consensus algorithm, the proposed block of transactions may be added to the blockchain. The consensus mechanism may include proof-of-work, proof-of-authority, proof-of-stake, or some other type of consensus algorithm. A blockchain may include a permissioned blockchain or may include an unpermissioned blockchain. The blockchain may include a portion of a blockchain hosted on a blockchain platform (such as the ETHEREUM blockchain platform provided by the Ethereum Foundation of Bern, Switzerland), or the blockchain may include its own separate blockchain. In some embodiments, one or more components or functions of the blockchain may be administered or managed by an administering party.

As used herein, the term "blockchain network" may include one or more nodes in data communication with each other and that maintain a copy of a blockchain. The blockchain network, in addition to the blockchain, may also include one or more smart contracts. One or more nodes of the blockchain network may execute the functionality of the smart contract. In some embodiments, the blockchain network may include one or more client devices. A client device may include a computing device that may not maintain a copy of the blockchain on the client device, but may still interact with the blockchain network. For example, a client device may send a blockchain transaction to one or more nodes for inclusion in a block that may eventually be appended to the blockchain. In this manner, the client device and the one or more nodes may interact in a client-server architecture.

As used herein, a "cryptocurrency" may include a digital currency whose ownership and use may be tracked on a blockchain of a blockchain network. Users of the blockchain network may send cryptocurrency to each other using blockchain transactions. Examples of cryptocurrencies include Bitcoin, Litecoin, and Ethereum.

In some embodiments, a blockchain network may include a native token. As used herein, a "native token" for a blockchain network may include the type of cryptocurrency tracked by that blockchain network. For example, the Bitcoin blockchain network includes Bitcoin as its native token. The Bitcoin blockchain network tracks the transfer of Bitcoins between users of the Bitcoin blockchain network. In some embodiments, a blockchain may not include any native tokens, or a blockchain may include multiple native tokens.

As used herein, the term "transaction" includes a piece of data that is includable in a blockchain. A transaction may include metadata describing the transaction. The metadata may include data indicating the author of the transaction, the time and date the transaction was generated, a digital signature of the transaction, or other data. In some embodiments, a transaction may include data indicating activity between parties of the blockchain network. For example, the transaction may include a source cryptocurrency wallet address (i.e., the cryptocurrency wallet address of the transaction's author), a destination cryptocurrency wallet address, a cryptocurrency amount, or the transfer of any data or cryptocurrency amount. A transaction may include issuing or minting an amount of cryptocurrency. A transaction may include a link to data stored off the blockchain and a hash of the data stored off the blockchain.

As used herein, the term "cryptocurrency wallet" may include a software program, a service, a device, or other media that stores cryptographic information used in interacting with the blockchain network. The cryptographic information may include a public and private key pair used in a public key infrastructure (PKI). A cryptocurrency wallet may correspond to a cryptocurrency wallet address. The cryptocurrency wallet address may include a string of data uniquely identifying the corresponding cryptocurrency wallet. A user's cryptocurrency balance on the blockchain network may not be stored in the wallet, but the user's balance may be determined by tracking cryptocurrency transfers to and from the wallet's address via the transactions of the blockchain.

As used herein, the term "smart contract" may include computer-executable instructions that may be executed by a node. The smart contract may automatically execute in response to detecting a specified condition or in response to receiving specified data. For example, a smart contract may be configured to read transactions of blocks that are added to a blockchain. In response to detecting, from the read transactions, that a predetermined cryptocurrency wallet's cryptocurrency balance exceeds a predetermined threshold, the smart contract may be configured to send a message. The code for the smart contract may be copied and synchronized across multiple nodes of the blockchain network, and each node may execute the smart contract to obtain the same result as the other nodes independently.

As used herein, a "digital stable token" may include a cryptocurrency whose value is stable. The stability of the digital stable token may result from the stable token being pegged to a fiat currency (e.g., the United States dollar), or from a user being able to obtain the digital stable token at a constant exchange rate. The digital stable token may be a type of cryptocurrency tracked by a blockchain network. Whereas the value of a conventional cryptocurrency is mainly influenced by supply of and demand for the cryptocurrency, the digital stable token may not be subject to such market forces because there may be a constant supply of the digital stable token at a constant price. Although the example of the digital stable token being pegged to the U.S. dollar is used, the digital stable token may be pegged to another type of fiat currency, or may be pegged to some other type of asset (e.g., another cryptocurrency, gold, etc.). A digital stable token may be fungible, i.e., one digital table token may be functionally equivalent to another digital stable token of the same type and can be equivalent to some other type of asset.

As used herein, a first party "sending" an amount of digital stable tokens to a second party may include the first party generating a blockchain transaction describing the transfer of the amount of digital stable tokens. The transaction may include data such as the amount of digital stable tokens being sent, a source cryptocurrency wallet address, a destination cryptocurrency wallet address, a digital signature authenticating that the first party generated the transaction, or other data. The transaction may be received and validated by the blockchain network that tracks the digital stable token, as described above. This "sending" may not necessarily include sending data from the a device of the first party to a device of the second party. For example, a first party sending cryptocurrency to a second party does not necessarily include the first party sending data from its device to a device of the second party, but may involve adjusting the cryptocurrency balance of each of the two parties on the applicable blockchain.

As used herein, a first amount of a cryptocurrency or fiat currency "corresponding" to a second amount of a cryptocurrency or fiat currency may include the first amount being substantially equivalent to the second amount. Whether the two amounts are substantially equivalent may be based on an established exchange rate. The established exchange rate may be set by one or more smart contracts used in exchanging the assets or may be set by other mechanisms for determining an exchange rate. The two amounts being substantially equivalent may take into account fees charged for exchanging the assets or other similar surcharges. As an example of a first amount of an asset corresponding to a second amount of another asset, one U.S. dollar may correspond to one digital stable token. A smart contract of the blockchain network may set the exchange rate. In another example, one U.S. dollar may correspond to one digital stable token, but a user exchanging one digital stable token may receive only 0.97 U.S. dollars because one or more components of the blockchain network may charge a 3% fee. In this case, one U.S. dollar may still correspond to one digital stable token. In one embodiment, a first amount and a second amount may include the first amount and the second amount being the same amount or may include them being a different amount.

As used herein, "minting" a digital stable token may include generating a new instance of the digital stable token, which may increase the supply of the digital stable tokens tracked by the applicable blockchain network. New instances of the digital stable token may be minted in response to one or more criteria. For example, in response to fulfilling a condition of a smart contract, the smart contract may mint new digital stable tokens and send them to a user of the blockchain.

As used herein, "burning" a digital stable token may include configuring the digital stable token such that it can no longer be sent to a user, held by a user, or otherwise used. Burning the digital stable token may effectively remove them from circulation as tracked by the applicable blockchain network. As an example, burning an amount of digital stable tokens may include sending the amount of digital stable tokens to a dead-end cryptocurrency wallet address (i.e., the address of a cryptocurrency wallet that is unable to send digital stable tokens). Further description on burning digital stable tokens and dead-end cryptocurrency wallets is described below.

The present disclosure is directed to systems and methods for blockchain-based transaction settlement. In some embodiments, the systems and methods may provide a first user (which may include a consumer user or a merchant user) the ability to deposit fiat currency in a trust entity. The trust entity may notify a blockchain network about the deposited fiat currency, and the blockchain network may transfer a corresponding amount of digital stable token to a cryptocurrency wallet of the first user. The first user may transact with a merchant, and the merchant may accept payment in the form of the digital stable tokens. The first user may use the blockchain network to transfer the digital stable tokens to the cryptocurrency wallet of the merchant. The merchant may then notify the blockchain network that the merchant desires to liquidate some of the merchant's digital stable tokens for a corresponding amount of fiat currency. The blockchain network may remove the digital stable tokens from the merchant's cryptocurrency wallet and may send an instruction to the trust entity to deposit a corresponding amount of fiat currency in the merchant's financial account at the trust entity. As a result, a merchant may receive payment for mercantile transactions more quickly than through credit card or debit card transactions or by exchanging conventional cryptocurrencies for fiat currency through a third party cryptocurrency exchange. Furthermore, since the merchant is using digital stable tokens in the payment process, the risk of price fluctuations in cryptocurrencies during the payment process is mitigated or eliminated.

FIG. 1 depicts one embodiment of a system 100. The system 100 may include a system for blockchain-based transaction settlement. As an overview, in one embodiment, the system 100 may include a blockchain network 102. The blockchain network 102 may include one or more blockchain transactions 104 and one or more smart contracts 106. The system 100 may include a trust entity 108. The system 100 may include a consumer user device 110. The system 100 may include a merchant user device 112. The system may include a data network 114. The blockchain network 102, the trust entity 108, the consumer user device 110, or the merchant user device 112 may be in data communication with each other over the data network 114. It should be noted that the system 100 may include any number of transactions 104, smart contracts 106, trust entities 108, consumer user devices 110, or merchant user devices 112, however, only a portion of them are shown in FIG. 1 for the sake of simplicity.

The blockchain network 102 may include a blockchain network, as described above. The transactions 104 of the blockchain network 102 may include the one or more transactions included in the blockchain of the blockchain network 102. The transactions 104 may include a transaction that a node or a client device has sent to one or more nodes intended to be added to the blockchain.

In one embodiment, the blockchain network 102 may include a digital stable token as a native token of the blockchain network 102. As described above, the digital stable token being a native token to the blockchain network 102 may include the blockchain network 102 tracking the usage and transfer of the digital stable token. The digital stable token may be pegged to a fiat currency (e.g., the U.S. dollar) such that the price of the digital stable token remains stable. As will be seen from the disclosure herein, users of the blockchain network 102 (such as users of consumer user devices 110 or merchant user devices 112) may send digital stable tokens to each other (in consumer-to-consumer transactions, consumer-to-merchant transactions, merchant-to-consumer transactions, or merchant-to-merchant transactions) in order to purchase goods or services without the need for fiat currency, conventional payment transaction settlement and clearance, or conventional cryptocurrency. By tracking the usage and transfer of the digital stable token native to the blockchain network 102, the users of the blockchain network 102 can conduct business with a negligible amount delay in being able to liquidate digital stable tokens for fiat currency and with a negligible amount of volatility that accompanies conducting business with conventional cryptocurrencies.

In some embodiments, the blockchain network 102 may include a permissioned blockchain network. A user wishing to join and use the blockchain network 102 may need to register with and be approved by an administrative entity that maintains or controls at least a portion of the nodes of the blockchain network 102. A user registering with the administrative entity may include providing certain information about the user to the entity (e.g., biographical information, financial information, etc.).

Figure 2:
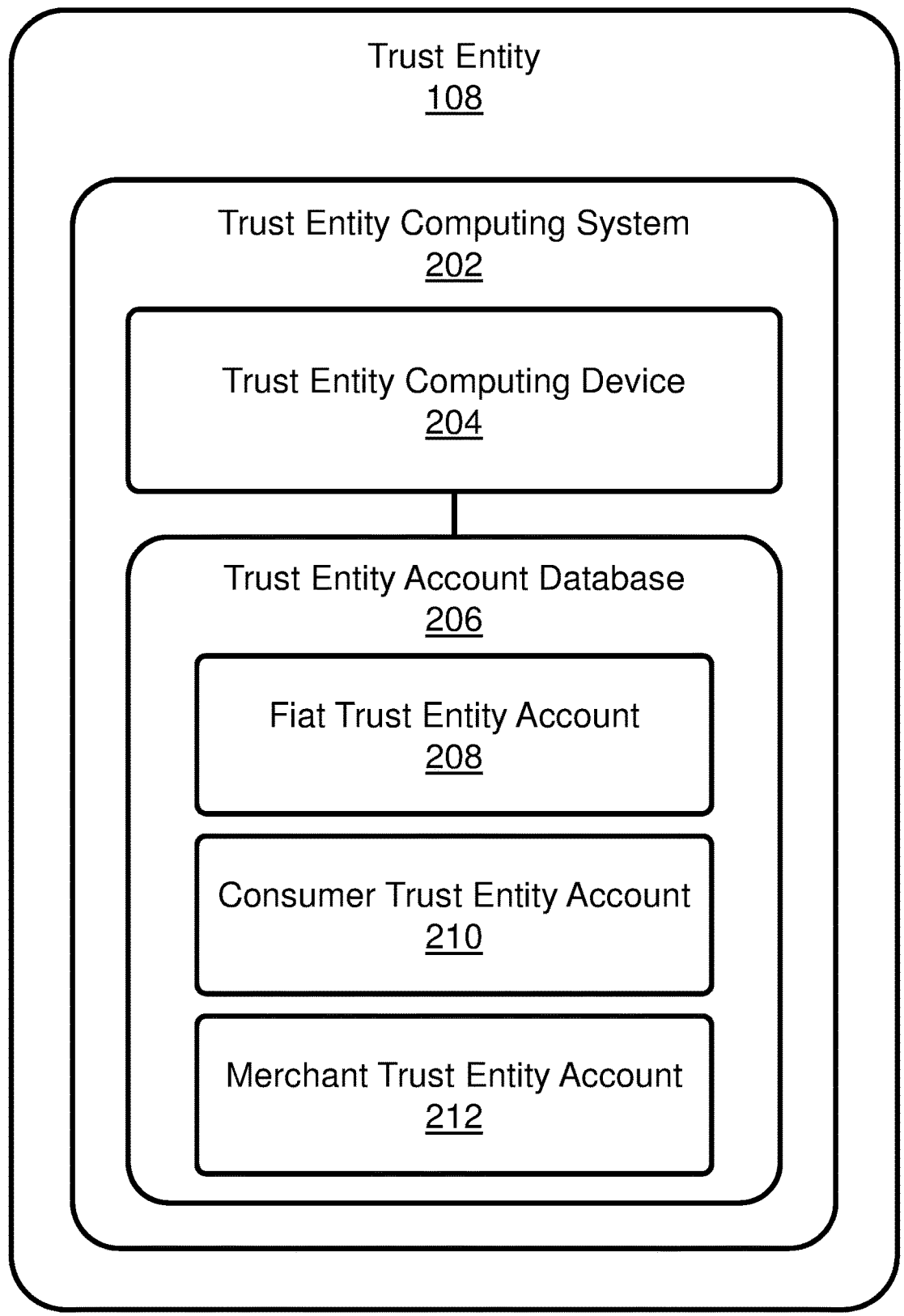
FIG. 2 is a schematic block diagram illustrating one embodiment of a trust entity of a system for blockchain-based transaction settlement.

Turning to FIG. 2, in one embodiment, the trust entity 108 may include a bank. In other embodiments, the trust entity 108 may include a credit union, investment firm, financial cooperative, or other financial institution. The trust entity 108 may include a regulated financial institution insured by a relevant government agency. The trust entity 108 may include a trust entity computing system 202. The trust entity computing system 202 may include a trust entity computing device 204. The trust entity computing device 204 may be in data communication with a trust entity account database 206. The trust entity account database 206 may maintain one or more financial accounts 208, 210, 212 of the trust entity 108.

In one embodiment, the trust entity account database 206 may include a fiat trust entity account 208. The fiat trust entity account 208 may hold fiat currency. The fiat trust entity account 208 may hold fiat currency for the benefit of (FBO) one or more trust entity 108 customers or account holders. In some embodiments, the trust entity account database 206 may include a consumer trust entity account 210. The consumer trust entity account 210 may include a financial account that holds fiat currency for a consumer who has a consumer user device 110. The consumer trust entity account 210 may include a checking account, saving account, or other financial account. The trust entity account database 206 may include a merchant trust entity account 212. The merchant trust entity account 212 may include a financial account that holds fiat currency for a merchant that has the merchant user device 112. Although FIG. 2 depicts one of each of the fiat trust entity account 208, the consumer trust entity account 210, and the merchant trust entity account 212, the trust entity account database 206 may include any number of fiat trust entity accounts 208, consumer trust entity accounts 210, or merchant trust entity accounts 212. Any of the consumer user devices 110 and merchant user devices 112 may correspond to the consumer trust account accounts 210 or merchant trust entity accounts 212, respectively.

In some embodiments, the trust entity computing device 204 may be configured to interact with the blockchain network 102. For example, in response to a user depositing fiat currency into the fiat trust entity account 208, the trust entity computing device 204 may notify the blockchain network 102 so that the blockchain network 102 can carry out certain functionality, which is further disclosed below. In another example, in response to receiving an instruction from the blockchain network 102, the trust entity computing device 204 may transfer fiat currency between financial accounts 208, 210, 212 in the trust entity account database 206.

Returning to FIG. 1, in one embodiment, the consumer user device 110 may include an apparatus. The apparatus may include a computing device. The consumer user device 110 may include a processor and a computer-readable storage medium. The computer-readable storage medium may include a cryptocurrency wallet. The cryptocurrency wallet may include a downloadable mobile application executable by the consumer user device 110. The mobile application may include a set of computer-readable instructions. The set of instructions may include software, such as a software application, that may be configured to perform functionality related to interacting with the blockchain network 102. The software may include a password to protect against misuse of the application, private key, or other data. The cryptocurrency wallet may include an address, a public key, or a private key. The address, public key, or private key may be used in generating cryptographically secure blockchain transactions. In some embodiments, the merchant user device 112 may include an apparatus. The apparatus may be similar to the apparatus of the consumer user device 110 (e.g., include a cryptocurrency wallet with an address, public key, and private key).

Figure 3:
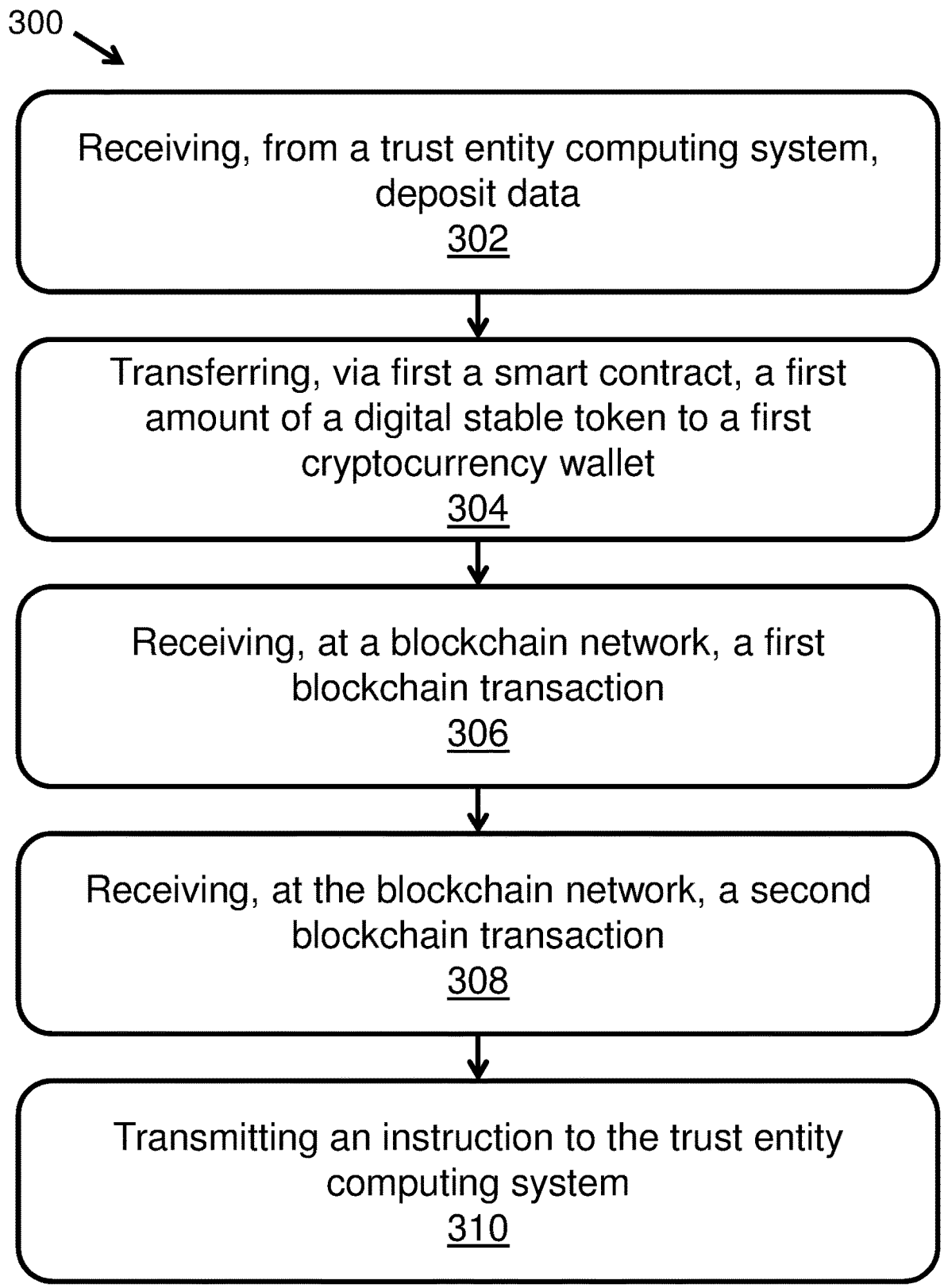
FIG. 3 is a flowchart diagram illustrating one embodiment of a method for blockchain-based transaction settlement.

FIG. 3 depicts one embodiment of a method 300. The method 300 may include a computer-implemented method. The method 300 may include a method for blockchain-based transaction settlement. The method 300 may be carried out under control of one or more computing devices executing computer-readable instructions. The one or more computing devices may include one or more nodes of the blockchain network 102.

The method 300 may include receiving 302, from a trust entity computing system, deposit data. The deposit data may include data identifying a first user and a first fiat amount. The method 300 may include transferring 304, via a first smart contract of a blockchain network, a first amount of a digital stable token to a first cryptocurrency wallet. The first amount of the digital stable token may correspond to the first fiat amount, and the first cryptocurrency wallet may include a cryptocurrency wallet of the first user. The method 300 may include receiving 306, at the blockchain network, a first blockchain transaction. The first blockchain transaction may include a first cryptocurrency wallet address, a second cryptocurrency wallet address (which may be the address of a second user's cryptocurrency wallet), and a second amount of the digital stable token. The method 300 may include receiving 308, at the blockchain network, a second blockchain transaction. The second blockchain transaction may include the second cryptocurrency wallet address and a third amount of the digital stable token. The method 300 may include transmitting 310 an instruction to the trust entity computing system. In response to receiving the instruction, the trust entity computing system may be configured to transfer a second fiat amount to an account of the second user. The second fiat amount may correspond to the third amount of the digital stable token.

In one embodiment, the trust entity may include the trust entity 108, and the trust entity computing system may include the trust entity computing system 202 of FIG. 2. The first user may include the consumer user of the consumer user device 110. The data identifying the first user may include the cryptocurrency wallet address of the consumer user, a unique identifier for the consumer user, or other data that may uniquely identify the consumer user. The first fiat amount may include an amount of fiat currency that the consumer user deposited into the fiat trust entity account 208. As used herein, a "fiat amount" and an "amount of fiat currency" are used interchangeably.

In one embodiment, the trust entity computing device 204 may receive an indication that a user has deposited fiat currency in the fiat trust entity account 208. For example, a user may visit a branch or an automatic teller machine (ATM) of the trust entity 108 and deposit fiat currency into the fiat trust entity account 208. In another example, the user may transfer fiat currency from the user's financial account at the trust entity 108 (e.g., the consumer trust entity account 210) to the fiat trust entity account 208. In another example, the user may transfer fiat currency from an external financial account (e.g., a checking account at a bank that is external from the trust entity 108) to the fiat trust entity account via an electronic funds transfer (EFT), wire transfer, a third-party payment processor (e.g., STRIPE of San Francisco, Calif., United States or PLAID of San Francisco, Calif., United States) or some other type of currency transfer. In response, the trust entity computing device 204 may adjust the balance(s) of the relevant accounts in the trust entity account database 206 and send the deposit data to the blockchain network 102.

In some embodiments, the mobile application of the consumer user device 110 may integrate the consumer's external financial account with the cryptocurrency wallet. This may allow the consumer user device 110 to transfer currency between the consumer's external financial account and the trust entity computing system 202. In some embodiments, the merchant entity may also integrate its external financial account with the merchant entity's cryptocurrency wallet or with the merchant trust entity account 212 such that the merchant entity can transfer fiat currency to the merchant user's external financial account. In some embodiments, by using the fiat trust entity account 208, the consumer or merchant trust entity accounts 210, 212, or the consumer entity or merchant entity external financial accounts, the administrative entity administering the blockchain network 102 may not possess funds owned by the consumer users and merchant users of the blockchain network 102.

Receiving 302 the deposit data from the trust entity computing system may include the trust entity computing device 204 sending the deposit data to an application programming interface (API) of another computing device. In one embodiment, receiving 302 the deposit data from the trust entity computing system may include the trust entity computing device 204 generating a blockchain transaction and sending the blockchain transaction to one or more nodes of the blockchain network 102. The blockchain transaction may include the data identifying the consumer user and the first fiat amount.

In one embodiment, the method 300 may include minting the first amount of the digital stable token. The minted digital stable tokens may be the native token of the blockchain network 102. Minting the first amount of the digital stable token may be in response to the blockchain network 102 receiving the deposit data from the trust entity computing system. In some embodiments, minting the first amount of the digital stable token may include a smart contract (e.g., the first smart contract that may be configured to send the first amount of digital stable tokens to the first user) of the smart contracts 106 minting the first amount of the digital stable token. Minting a digital stable token may include a smart contract generating the digital stable token instead of obtaining an already-available digital stable token, for example, from a reserve of digital stable tokens or from a cryptocurrency exchange, for example.

In some embodiments, the first smart contract may include a smart contract of the smart contracts 106 of the blockchain network 102 of FIG. 1. The first smart contract may automatically transfer 304 the first amount of the digital stable token to the consumer user's cryptocurrency wallet upon detecting the deposit data. In some embodiments, the transferring 304 step may include the first smart contract may generating a third blockchain transaction that may include the address of the consumer user's cryptocurrency wallet address and the first amount of the digital stable token.

Figure 4:
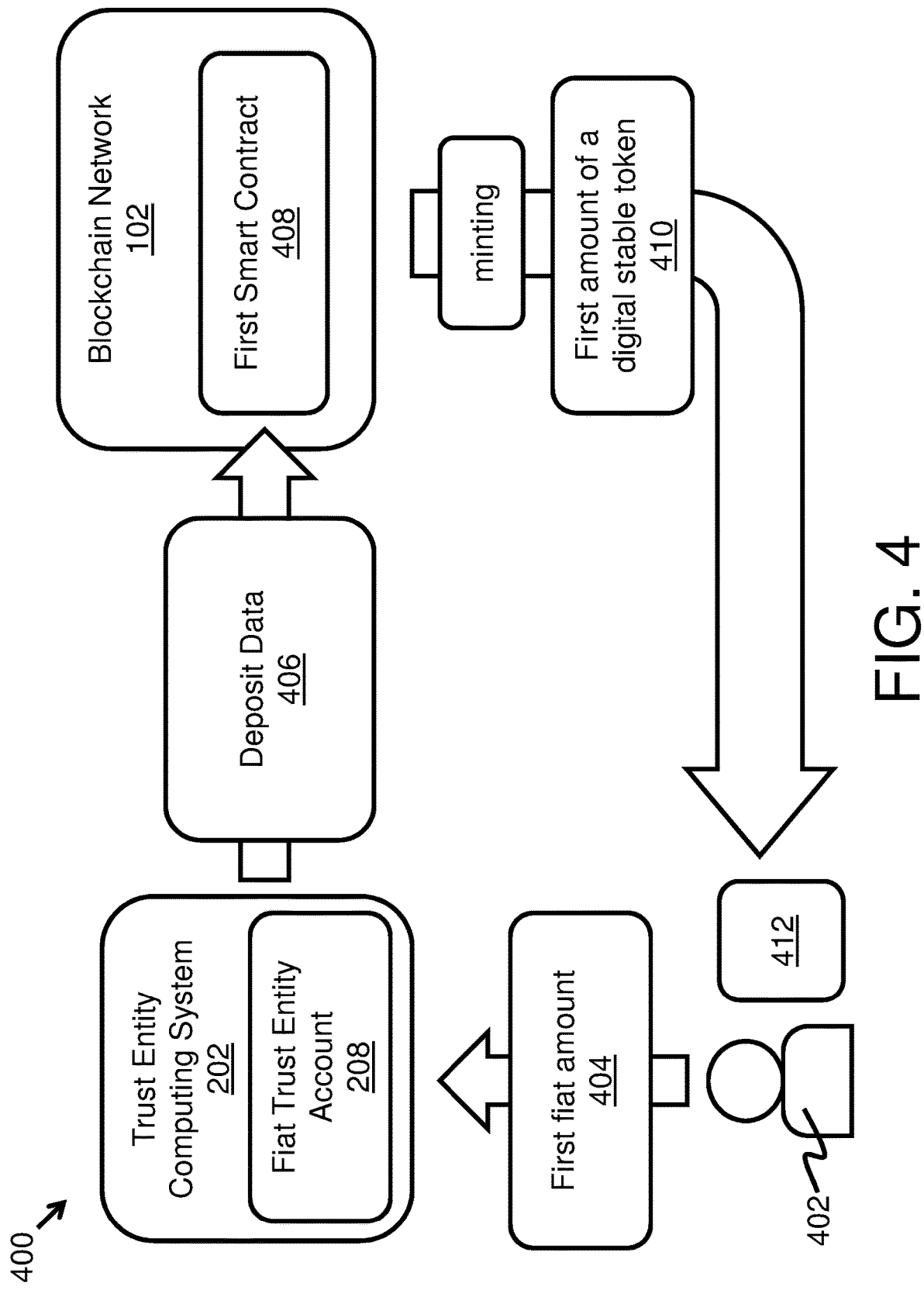
FIG. 4 is a schematic block diagram illustrating one embodiment of a system for blockchain-based transaction settlement.

FIG. 4 depicts one embodiment of a system 400 that depicts one example of the steps 302 and 304 of the method 300. The consumer user 402 may send the first fiat amount 404 to the trust entity computing system 202. The trust entity computing system 202 may deposit the first fiat amount 404 in the fiat trust entity account 208. The trust entity computing system 202 may send the deposit data 406 to the blockchain network 102. The first smart contract 408 may detect the deposit data (e.g., by reading one or more blockchain transactions that include the deposit data or via an API, as described above), and, in response, may generate a third blockchain transaction that mints the first amount of digital stable token 410 and transfers them to the cryptocurrency wallet 412 of the consumer user 402. The first amount of digital stable token 410 may be native to the blockchain network 102.

In some embodiments, the trust entity computing system 202 may deposit a portion of the first fiat amount 404 in a financial account other than the fiat trust entity account 208. This other account may include the financial account of an entity that owns, operates, controls, or otherwise maintains at least a portion of the blockchain network 102. The portion of the first fiat amount 404 may include a fee charged by the entity in order to maintain the blockchain network 102. The fee may include a percentage of the first fiat amount 404, a flat fee, or some other type of fee.

In one embodiment, as an example of the process depicted in the system 400, the consumer user 402 may take $100 in cash as the first fiat amount 404 to a branch of the trust entity 108 in order to obtain digital stable tokens. The trust entity computing system 202 may deposit $97 of the $100 in the fiat trust entity account 208 and charge a $3 fee, which it may deposit in another financial account. The trust entity computing system 202 may generate a blockchain transaction that includes the deposit data 406. The deposit data 406 may include the cryptocurrency wallet 412 address of the consumer user 402 and the amount of $97. The trust entity computing system 202 may send the transaction to the blockchain network 102. The blockchain network 102 may add the transaction to the blockchain, and the first smart contract 408 may read the transaction. The first smart transaction may mint 97 digital stable tokens as the first amount of the digital stable token 410 and transfer the 97 digital stable tokens to the consumer user's 402 cryptocurrency wallet 412 address.

Returning to step 306 of FIG. 3, the first blockchain transaction may include the consumer user spending digital stable tokens at a merchant's business. The first cryptocurrency wallet address may include the consumer user's cryptocurrency wallet address as the source address, the second cryptocurrency wallet address may include the merchant user's cryptocurrency wallet address as the destination address, and the second amount of the digital stable token may include the amount of digital stable tokens the consumer user is spending at the merchant. The consumer user device 110 may generate the first blockchain transaction and send it to one or more nodes of the blockchain network 102 for validation and inclusion in the blockchain.

In some embodiments, the method 300 may include, in response to receiving 306 the first blockchain transaction, transferring a portion of the second amount of digital stable token to a fourth cryptocurrency wallet address. The fourth cryptocurrency wallet may include a cryptocurrency wallet of an entity that owns, operates, controls, or otherwise maintains at least a portion of the blockchain network 102. The portion may include a transaction fee. The transaction fee may be a fee charged by the entity to help maintain the blockchain network 102. In one embodiment, the one or more nodes of the blockchain network 102 may be configured to automatically transfer the transaction fee to the fourth cryptocurrency wallet address.

Figure 5:
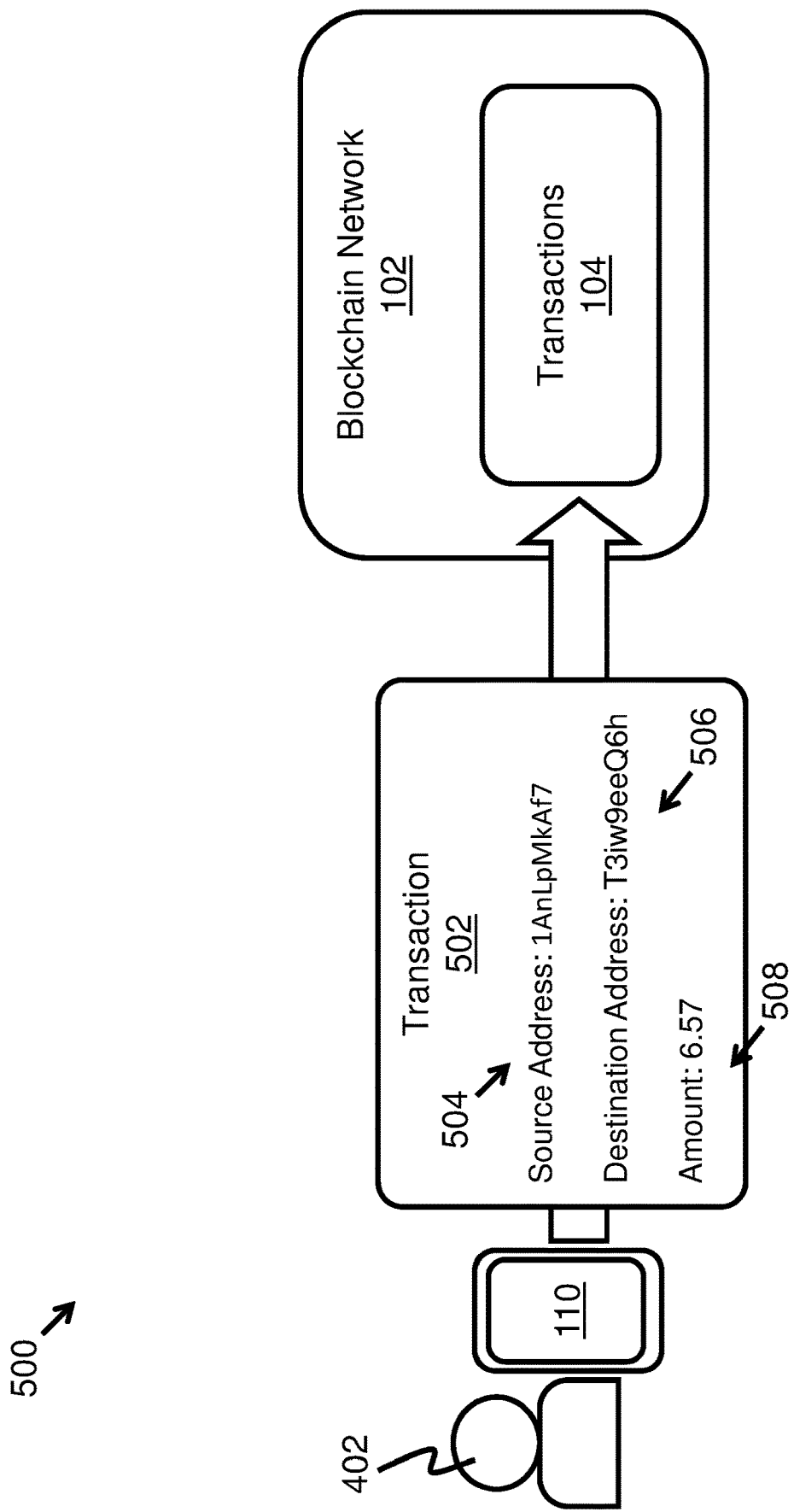
FIG. 5 is a schematic block diagram illustrating one embodiment of a system for blockchain-based transaction settlement.

FIG. 5 depicts one embodiment of a system 500 that depicts one example of the step 306 of FIG. 3. In the example of FIG. 5, the consumer user 402 may use the consumer user device 110 to generate the first blockchain transaction 502. The transaction 502 may include the source address 504. The source address may include the consumer user's 402 cryptocurrency wallet address (e.g., the address of the consumer user cryptocurrency wallet 412 of FIG. 4). The transaction 502 may include the destination address 506. The destination address 506 may include the cryptocurrency wallet address of the merchant user. The transaction 502 may include the second amount 508 of the digital stable token. The digital stable token may be the native token of the blockchain network 102. The consumer user device 112 may send the transaction 502 to the blockchain network 102. The blockchain network 102 may receive the transaction 502 at the blockchain network's 102 one or more nodes, which may validate the transaction 502, add the transaction 502 to a block to be added to the blockchain's transactions 104 according to the blockchain network's 102 consensus mechanism.

Returning to step 308 of FIG. 3, in some embodiments, the second blockchain transaction may include data describing that the merchant user is liquidate a portion of the digital stable tokens it owns and wishes to receive a corresponding amount of fiat currency. This liquidating processing (i.e., receiving fiat currency in exchange for digital stable tokens) may be called "cashing out." The second blockchain transaction may include the second cryptocurrency wallet address, a third cryptocurrency wallet address, and a third amount of digital stable tokens. The second cryptocurrency wallet address may include the cryptocurrency wallet address of the merchant user as the source address. The second blockchain transaction may include a third cryptocurrency wallet address as the destination address. The third amount of the digital stable token may include the amount of digital stable tokens that the merchant user is cashing out in order to receive the corresponding fiat amount. In some embodiments, the merchant user device 112 may generate the second blockchain transaction and sent it to one or more nodes of the blockchain network 102 for validation and inclusion in the blockchain.

In some embodiments, the merchant user cashing out may include the merchant user burning the third amount of the digital stable token. Burning digital stable tokens, which may be native to the blockchain network 102, may include configuring the digital stable tokens such that they can no longer be sent to another user of the blockchain network 102, held by another user, or otherwise used in the blockchain network 102. In one embodiment, burning digital stable tokens may include sending the digital stable tokens to a dead-end cryptocurrency wallet address. A dead-end cryptocurrency wallet address may include an address whose corresponding cryptocurrency wallet cannot send cryptocurrency. The cryptocurrency wallet may not be able to send cryptocurrency because the required cryptographic information (such as the wallet's private key) may have been lost, destroyed, or otherwise been made unavailable. In some embodiments, the cryptocurrency wallet may require a password to operate, and the password may have been lost, destroyed, or otherwise been made unavailable. In some embodiments, the third cryptocurrency wallet address (the destination address in the second blockchain transaction) discussed above in relation to the step 308 may include a dead-end cryptocurrency wallet address. By sending the third amount of the digital stable token to the dead-end cryptocurrency wallet address, the third amount of the digital stable token may be burned or otherwise made permanently unavailable.

In one embodiment, the method 300 may include, in response to the receiving the second blockchain transaction, transferring a portion of the third amount of digital stable token to a fifth cryptocurrency wallet address. The fifth cryptocurrency wallet may include a cryptocurrency wallet of an entity that owns, operates, controls, or otherwise maintains at least a portion of the blockchain network 102. In some embodiments, the fifth cryptocurrency wallet may include the fourth cryptocurrency wallet (i.e., the cryptocurrency wallet configured to receive the transaction fee, discussed above). The portion may include a cash out fee. The cash out fee may be a fee charged by the entity to help maintain the blockchain network 102. In one embodiment, the one or more nodes of the blockchain network 102 may be configured to automatically transfer the cash out fee to the fifth cryptocurrency wallet address.

In some embodiments, transmitting 310 the instruction to the trust entity computing system may include a second smart contract generating or transmitting the instruction. For example, a smart contract of the smart contracts 106 of the blockchain network 102 may generate the instruction in response to detecting the third amount of the digital stable token being sent to the third cryptocurrency wallet address. In another embodiment, the smart contract may be configured to cause another application to generate a message. The message may include the second fiat amount that the trust entity 106 is to send to the second user and data identifying the second user. The message may be sent via a variety of messaging methods such as email, short message service (SMS), internet relay chat (IRC), an instant messaging service, or some other messaging service. The message may be sent via the data network 112. In one embodiment, transmitting 210 the instruction to the trust entity computing system may include sending the instruction to an API of the trust entity computing system 202.

Figure 6:
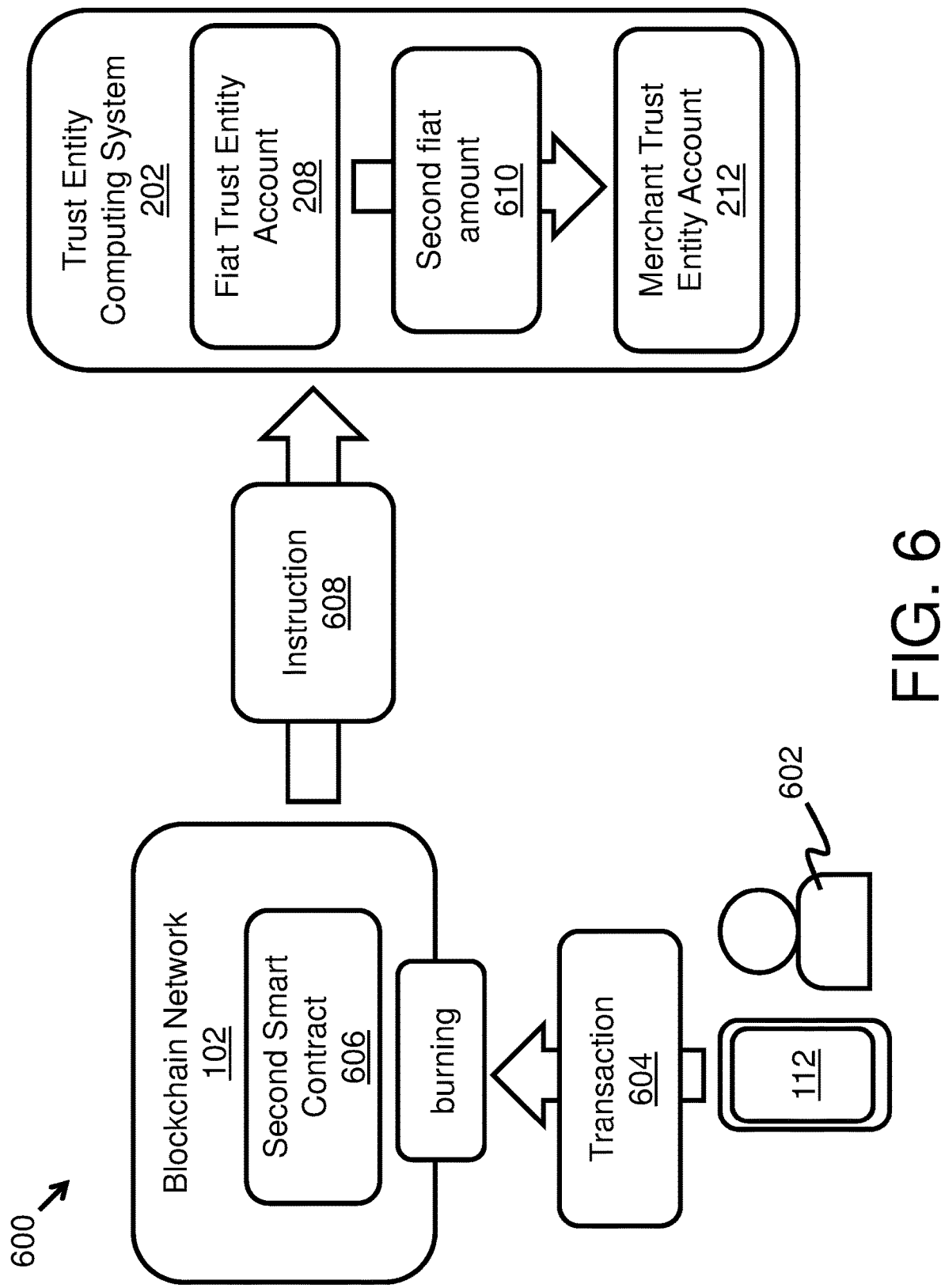
FIG. 6 is a schematic block diagram illustrating one embodiment of a system for blockchain-based transaction settlement.

FIG. 6 depicts one embodiment of a system 600 that depicts one example of the steps 308 and 310 of FIG. 3. As depicted in FIG. 6, the merchant user 602 may use the merchant user device 112 to generate the second blockchain transaction 604. The second blockchain transaction 604 may include a transaction that burns the third amount of the digital stable token. The blockchain network 102 may receive the transaction 604, validate the transaction 604, and add it to the blockchain. The second smart contract 606 may detect the transaction 604 as a cash out transaction (because, for example, the destination address of the transaction 604 is the third cryptocurrency wallet address, which may be a dead-end cryptocurrency wallet address where digital stable tokens are sent to be burned). In response, the second smart contract 606 may determine the third amount of the digital stable token in the transaction 604 and send the instruction 608 to the trust entity computing system 202, which may include the third amount of the digital stable token that is native to the blockchain network 102. The trust entity computing system 202 may receive the instruction and may transfer the corresponding second fiat amount 610 from the fiat trust entity account 208 to the merchant trust entity account 212.

As an example of the process depicted in FIG. 6, the merchant user device 112 of the merchant user 602 may generate the transaction 604. The transaction 604 may include the merchant user's cryptocurrency wallet address as the source address, a dead-end cryptocurrency wallet address as the destination address, and twenty (20) digital stable tokens as the third amount of the digital stable token. The merchant user device 112 may send the transaction 604 to the blockchain network 102. The second smart contract 606 may be configured to detect transactions that include the dead-end cryptocurrency wallet address as the destination address. The second smart contract 606 may generate the instruction 608. The instruction 608 may include data identifying the merchant user 602 and nineteen (19) digital stable tokens (the twenty digital stable tokens being cashed out minus one token deducted as a cash out fee prior to the tokens being sent to the dead-end cryptocurrency wallet). The second smart contract 606 may send the instruction 608, and the trust entity computing system 202 may receive the instruction 608. The trust entity computing device 204 may process the instruction 608 by identifying the merchant trust entity account 212 based on the identifying data in the instruction 608 and by transferring $19 from the fiat trust entity account 208 to the merchant trust entity account 212.

In one embodiment, the instruction to the trust entity 108 of the step 310 may include an instruction to the trust entity computing system 202 to transfer the second fiat amount to an external financial account of the merchant. The trust entity computing system 202 may send the second fiat amount from the fiat trust entity account 208 or from the merchant trust entity account 212. The trust entity computing system 202 may send the second fiat amount via an EFT, wire transfer, a third-party payment processor, an automated clearing house (ACH) transfer, or some other type of currency transfer.

While the steps 308 and 310 have been discussed regarding the merchant user cashing out digital stable tokens for fiat currency, in some embodiments, a consumer user may use the same process to cash out digital stable tokens for fiat currency. The consumer user may use the consumer user device 110 to generate a blockchain transaction 604 that burns digital stable tokens, the second smart contract 606 may detect the burning and send the instruction 608 to the trust entity computing system 202, and the trust entity computing system 202 may transfer the second fiat amount from the fiat trust entity account 208 to either the consumer trust entity account 210 or an external financial account owned by the consumer user.

In one embodiment, the method 300 may include the merchant user sending an amount of digital stable tokens to another merchant user. The method 300 may include receiving, at the blockchain network 102, a fourth blockchain transaction. The fourth blockchain transaction may include the second cryptocurrency wallet address (i.e., the merchant user's cryptocurrency wallet address) as the source address. The fourth blockchain transaction may include a sixth cryptocurrency wallet address (i.e., the other merchant user's cryptocurrency wallet address) as the destination address. The fourth blockchain transaction may include a fourth amount of the digital stable token (i.e., the amount of digital stable tokens the merchant user is transferring to the other merchant user). The blockchain network 102 may receive the fourth transaction, validate the transaction, and add the transaction to the transactions 104 according to the consensus mechanism of the blockchain network 102. This process may include similar functionality to the consumer user sending digital stable tokens to the merchant user.

Figure 7:
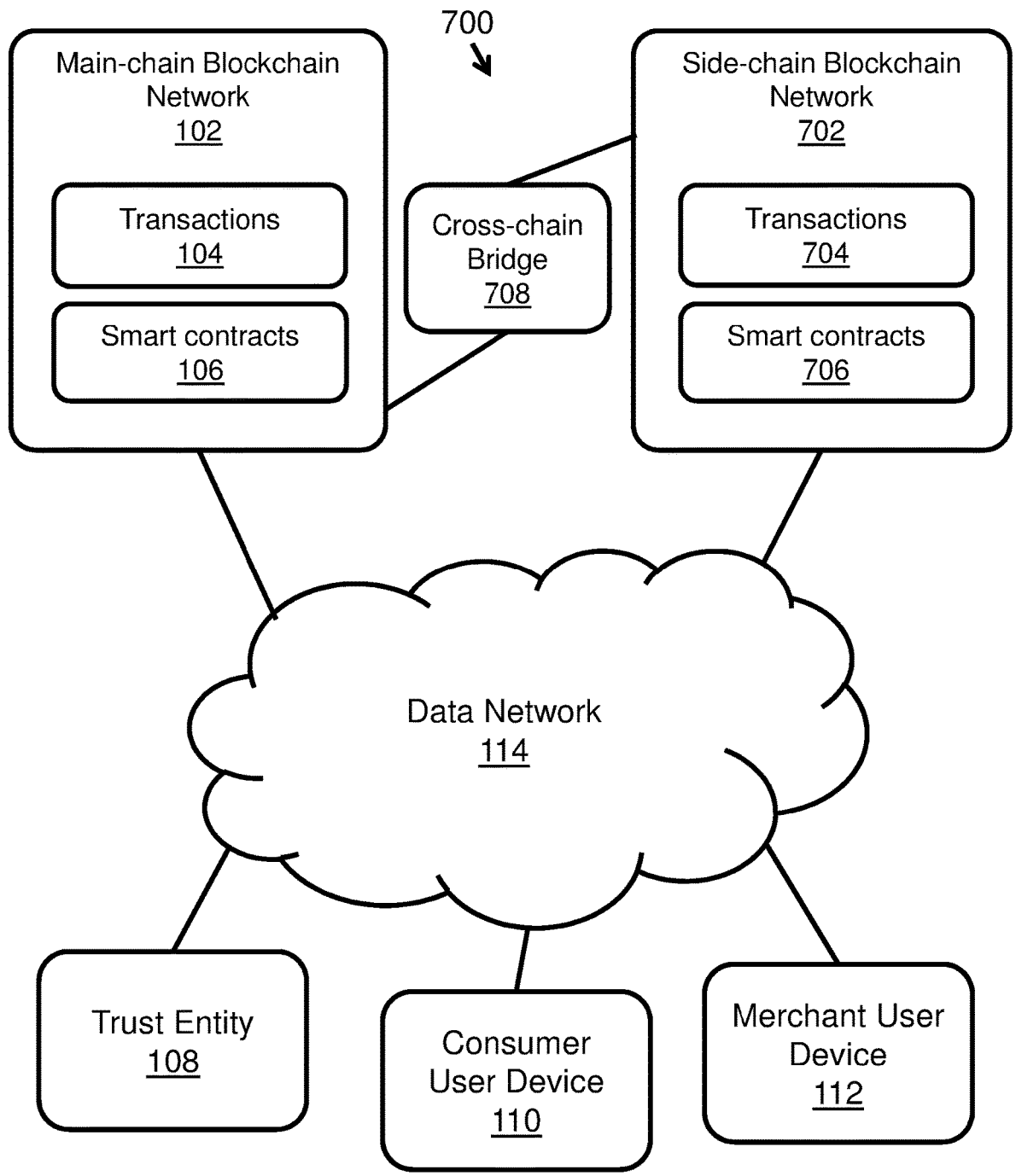
FIG. 7 is a schematic block diagram illustrating one embodiment of a system for blockchain-based transaction settlement.

In some embodiments, a user may desire to obtain digital stable tokens native to the blockchain network 102 without depositing fiat currency into the trust entity 108. Instead, the user may desire to exchange cryptocurrency for digital stable tokens. However, the user may want to exchange the cryptocurrency for digital stable tokens without using a cryptocurrency exchange. This may be because using a cryptocurrency exchange may be slow and may involve paying the cryptocurrency exchange a fee. FIG. 7 depicts one embodiment of a system 700. The system 700 may include a system for blockchain-based transaction settlement. The system 700 may allow a user to exchange cryptocurrency for digital stable tokens without the user having to use a cryptocurrency exchange.

The system 700 may include a main-chain blockchain network 102, which may include one or more transaction 104 and one or more smart contracts 106. The main-chain blockchain network 102 may be similar to the blockchain network 102 of the FIG. 1. The main-chain blockchain network 102 may include the digital stable token as a native token. The system 700 may include a side-chain blockchain network 702. The side-chain blockchain network 702 may be similar to the main-chain blockchain network 102 in that it may include a blockchain network with one or more nodes that maintain a side-chain blockchain, one or more transactions 704, and one or more smart contracts 706. To distinguish between the nodes of the different blockchain networks 102, 702, the nodes of the main-chain blockchain network 102 are now referred to as "main-chain nodes," and the nodes of the side-chain blockchain network 102 are now referred to as "side-chain nodes." The side-chain blockchain maintained by the side-chain network 702 may be different than the main-chain blockchain of the main-chain blockchain network 102. The side-chain blockchain may track users' transfers and receipts of a cryptocurrency other than the digital stable token tracked by the main-chain blockchain. This other cryptocurrency may be native to the side-chain blockchain network 702. For example, the side-chain blockchain network 702 may include the Bitcoin network, the Ethereum blockchain network (with its native Ethereum token), or some other cryptocurrency network.

The system 700 may include a token cross-chain bridge 708. The token cross-chain bridge 708 may allow for users on the different blockchain networks 102, 702 to exchange cryptocurrency for digital stable tokens, or vice versa, without the use of a cryptocurrency exchange. This may allow users to exchange cryptocurrency and digital stable tokens without the added complexity of a cryptocurrency exchange, the delays associated with cryptocurrency exchanges, and without cryptocurrency exchange fees. The token cross-chain bridge 708 may include one or more nodes executing token cross-chain bridge software, referred to as "bridge nodes." The token cross-chain bridge 708 may include one or more smart contracts implemented on the different blockchain networks 102, 702. The token cross-chain bridge 708 may include functionality that receives notifications from the different blockchain networks 102, 702 or that detects events on the different blockchain networks 102, 702 and, in response, facilitates the exchange of cryptocurrency and digital stable tokens.

The token cross-chain bridge 708 may include one or more bridge nodes implementing token cross-chain bridge software. In some embodiments, the same computing device may host multiple types of nodes, and at least a portion of the multiple nodes may include nodes from different blockchain networks 102, 702 or the token cross-chain bridge 708. For example, a single computing device may host a main-chain node and a side-chain node, a main-chain node and a bridge node, a side-chain node and a bridge node, or a main-chain node, side-chain node, and a bridge node.

The token cross-chain bridge 708 may receive notifications from or detect events on the different blockchain networks 102, 702 and, in response, facilitate the exchange of cryptocurrency and digital stable tokens. In one embodiment, the token cross-chain bridge 708 may receive a first notification from a smart contract of the side-chain blockchain network 702. The first notification may include data identifying the user wishing to exchange cryptocurrency for digital stable tokens (e.g., the cryptocurrency wallet address of the user on the side-chain blockchain network 702). The first notification may include the amount of cryptocurrency the user wishes to exchange. In response to receiving the first notification, the token cross-chain bridge 708 may send a second notification to a smart contract of the main-chain blockchain network 102. The second notification may include data identifying the user wishing to exchange cryptocurrency for digital stable tokens (e.g., the cryptocurrency wallet address of the user on the main-chain blockchain network 102). The second notification may include the corresponding amount of digital stable tokens the user should receive in exchange for the cryptocurrency.

In one embodiment, instead of receiving the first notification from the smart contract the side-chain blockchain network 702, the token cross-chain bridge 708 may detect that the user sent the amount of cryptocurrency the user wishes to exchange to a predetermined cryptocurrency wallet address on the side-chain blockchain network 702. The token cross-chain bridge 708 may detect, via the smart contract, a transaction in the transactions 704 of the side-chain blockchain network 702 that corresponds with a user wanting to exchange cryptocurrency native to the side-chain blockchain network 702 for a corresponding amount of digital stable tokens native to the main-chain blockchain network 102. In response to detecting this data, the token cross-chain bridge 708 may send the second notification to the main-chain blockchain network 102.

In some embodiments, the token cross-chain bridge 708 may receive a first notification from a smart contract of the main-chain blockchain network 102. The first notification may include data identifying the user wishing to exchange digital stable tokens for cryptocurrency (e.g., the cryptocurrency wallet address of the user on the main-chain blockchain network 102). The first notification may include the amount of digital stable tokens the user wishes to exchange. In response to receiving the first notification, the token cross-chain bridge 708 may send a second notification to a smart contract of the side-chain blockchain network 702. The second notification may include data identifying the user wishing to exchange cryptocurrency for digital stable tokens (e.g., the cryptocurrency wallet address of the user on the side-chain blockchain network 702). The second notification may include the corresponding amount of cryptocurrency the user should receive in exchange for the digital stable tokens.

In one embodiment, instead of receiving the first notification from the smart contract the main-chain blockchain network 102, the token cross-chain bridge 708 may detect that the user sent the amount of digital stable tokens the user wishes to exchange to a predetermined cryptocurrency wallet address on the main-chain blockchain network 102. The token cross-chain bridge 708 may do this by detecting, via the smart contract, a transaction of the transactions 104 of the main-chain blockchain network 102, indicating that a user is exchanging digital stable tokens native to the main-chain blockchain network 102 for a corresponding amount of cryptocurrency, which may be native to the side-chain blockchain network 702. In response to detecting this data, the token cross-chain bridge 708 may send the second notification to the side-chain blockchain network 702.

In some embodiments, the token cross-chain bridge 708 may determine the exchange rate between a cryptocurrency and the digital stable tokens. For example, a smart contract of the token cross-chain bridge 708 may retrieve an exchange rate from one or more cryptocurrency exchanges or an oracle (an external, third-party software service that may maintain cryptocurrency exchange rates). For example, if a user is attempting to exchange Bitcoin for digital stable tokens pegged to the U.S. dollar, the smart contract may retrieve a Bitcoin-U.S. dollar exchange rate of $9,000 per Bitcoin. Thus, the smart contract would determine that the exchange rate of Bitcoins-to-digital stable tokens is 9,000 digital stable tokens per Bitcoin. In other embodiments, a smart contract of the main-chain blockchain network 102 or the side-chain blockchain network 702 may determine the exchange rate.

In some embodiments, the token cross-chain bridge 708 may validate data of the main-chain blockchain network 102 or the side-chain blockchain network 702 that may be associated with the cryptocurrency-digital stable token exchange. Validating the data may include determining whether the user is attempting to double spend cryptocurrency or digital stable tokens. Validating the data may include determining that the user no longer controls the cryptocurrency or digital stable tokens that the user is attempting to exchange. In some embodiments, the token cross-chain bridge 708 may not send the second notification until after the validation process is complete.

The system 700 may include one or more other components of the system 100. For example, the system 700 may include the trust entity 108, the consumer user device 110, merchant user device 112, or data network 114. The various components of the system 700 may be in data communication with each other over the data network 114. Furthermore, the system 700 may include any number of side-chain blockchain networks 702, token cross-chain bridges 708, trust entities 108, consumer user devices 110, and merchant user devices 112.

In one embodiment, the method 300 of the FIG. 3 may further include receiving, at the first smart contract of the main-chain blockchain network 102, a notification from the token cross-chain bridge 708. The method 300 may further include sending, via the first smart contract, a fifth amount of the digital stable token to the first cryptocurrency wallet. The notification from the token cross-chain bridge 708 may include second notification discussed above.

Figure 8:
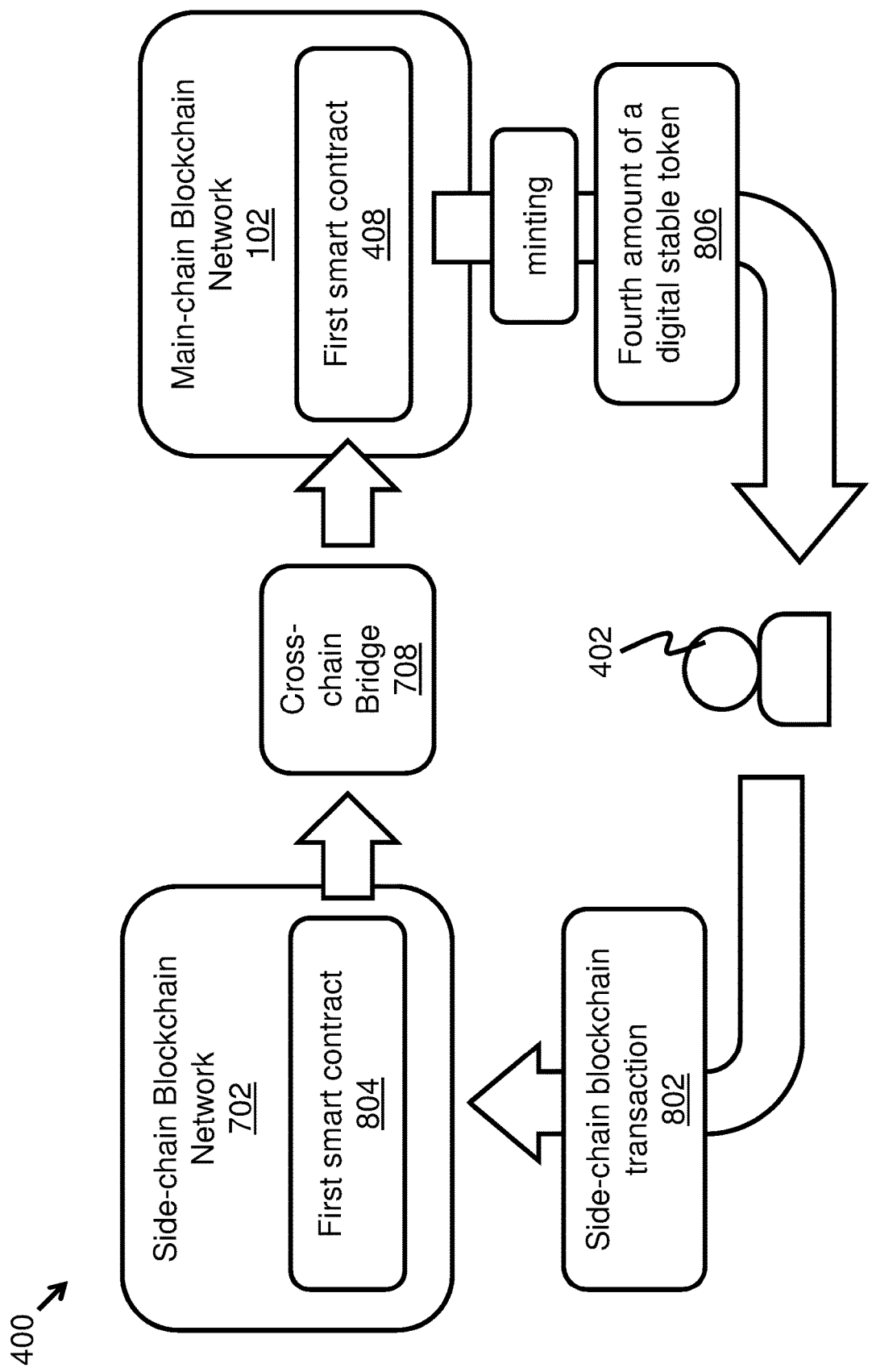
FIG. 8 is a schematic block diagram illustrating one embodiment of a blockchain transaction of a system for blockchain-based transaction settlement.

FIG. 8 depicts one embodiment of an example process for exchanging cryptocurrency for digital stable tokens. The consumer user 402 may use the consumer user device 110 to generate a side-chain blockchain transaction 802 for the side-chain blockchain network 702. The side-chain blockchain transaction 802 may include the consumer user's cryptocurrency wallet address on the side-chain blockchain as the source address. The transaction 802 may include another cryptocurrency wallet address on the side-chain blockchain as the destination address. The transaction 802 may include a first amount of cryptocurrency. The cryptocurrency may be native to the side-chain blockchain network 702. The consumer user device 110 may send the transaction 802 to the side-chain blockchain network 702 for validation and inclusion in the transactions 704.

Continuing the example, a first smart contract 804 of the one or more smart contracts 706 of the side-chain blockchain network 702 may detect the side-chain blockchain transaction 802. In response, the first smart contract 804 may send the first notification to the token cross-chain bridge 708. The token cross-chain bridge 708 may receive the first notification and validate data on the side-chain blockchain network 702 or the main-chain blockchain network 102 (such as validating that the consumer user is not attempting to double spend the first amount of cryptocurrency or that the consumer user has not already received the corresponding amount of the digital stable token). The token cross-chain bridge 708 may generate the second notification and send it to the first smart contract 408 of the main-chain blockchain network 102 indicating that the main-chain blockchain network 102 should mint the fifth amount 806 of the digital stable token and send the fifth amount 806 to the consumer user 402. The fifth amount 806 of the digital stable token may include stable tokens native to the blockchain network 102. In one or more embodiments, sending, via the first smart contract, the fifth amount of the digital stable token to the consumer user may include the first smart contract of the one or more smart contracts 106 generating a main-chain blockchain transaction with the consumer user's cryptocurrency wallet address as the destination address and the fifth amount of the digital stable token as the amount of tokens being sent.

In some embodiments, the main-chain blockchain network 102 may mint the fifth amount of the digital stable token in response to receiving the second notification from the token cross-chain bridge 708. In other embodiments, the first smart contract of the main-chain blockchain network 102 may transfer already existing digital stable tokens as the fifth amount of the digital stable token.

In some embodiments, the method 300 may further include locking the first amount of cryptocurrency. Locking cryptocurrency may help prevent double-spending of the cryptocurrency or may assist in other fraud-prevention measures. Locking the cryptocurrency may also make the cryptocurrency unavailable without permanently burning the cryptocurrency. Locking the first amount of cryptocurrency may include locking the first amount via the first smart contract of the side-chain blockchain network 702. Locking the first amount of cryptocurrency may include transferring the first amount to a cryptocurrency wallet that is not controlled by the consumer user. In some embodiments, locking an amount of cryptocurrency may include taking control of the amount of cryptocurrency away from the consumer user. The cryptocurrency wallet not controlled by the consumer user may be controlled by another user, and the other user may transfer the amount of cryptocurrency to other cryptocurrency wallets. In some embodiments, the first smart contract locking the first amount of the cryptocurrency may include the first smart contract keeping the first amount in the cryptocurrency wallet of the first smart contract or sending the first amount to another cryptocurrency wallet not controlled by the first user.

In some embodiments, the consumer user may desire to exchange digital stable tokens for a different type of cryptocurrency, such as the type of cryptocurrency tracked by the side-chain blockchain network 702. In some embodiments, the main-chain blockchain network 102 may be configured to receive a third blockchain transaction. The third blockchain transaction may include the consumer user's cryptocurrency wallet address as the source address. The transaction may include a fourth cryptocurrency wallet address as the destination address. The fourth cryptocurrency wallet address may include a dead-end cryptocurrency wallet address. The transaction may include a fifth amount of the digital stable token. The main-chain blockchain network 102 may be further configured to send, via the first smart contract, a second notification to the token cross-chain bridge 708. The second notification may include the fifth amount of the digital stable token.

The token cross-chain bridge 708 may receive the second notification, perform similar validation checks on the main-chain blockchain network 102 and the side-chain blockchain network 702, and may send a notification to the first smart contract on the side-chain blockchain network. In response to receiving the notification, the first smart contract of the side-chain blockchain network may send a second amount of cryptocurrency to the consumer user. The second amount of the cryptocurrency may correspond to the fifth amount of the digital stable token.

In some embodiments, by utilizing the token cross-chain bridge 708, the consumer user may exchange cryptocurrency for digital stable tokens, or digital stable tokens for cryptocurrency without having to use a cryptocurrency exchange. This may allow the user to quickly swap between digital stable tokens and cryptocurrency without having to wait for transactions to settle with a cryptocurrency exchange, nor having to pay a fee to the cryptocurrency exchange.

In some embodiments, the main-chain blockchain network 102 may be further configured to lock the fifth amount of the digital stable token. Locking the fifth amount of the digital stable token may include locking the fifth amount via the first smart contract of the main-chain blockchain network 102.

In some embodiments, a consumer user or a merchant user may use the main-chain blockchain network 102 to obtain a loan. The consumer user device 108 or the merchant user device 110 may be configured to send an amount of the digital stable token to a smart contract of the smart contracts 106 of the main-chain blockchain network 102. The consumer user or merchant user may send this amount of the digital stable token as collateral for the loan. The smart contract may send an instruction to the trust entity computing system 202 indicating that the trust entity 108 is to loan the user a certain amount of fiat currency. The smart contract may send the collateral digital stable token amount to a cryptocurrency wallet controlled by the trust entity 108. In response, the trust entity 108 may send the fiat currency to the consumer trust entity account 210 or the merchant trust entity account 212. In response to the consumer user or merchant user paying off the loan, the trust entity computing system 202 may send an indication to the smart contract that the user has paid off the loan. The smart contract may release the collateral and send the amount of the digital stable token back to the relevant user. In response to the consumer user or merchant user defaulting on the loan, the trust entity computing system 202 may send an indication to the smart contract, and the smart contract may send the collateral to the cryptocurrency wallet controlled by the trust entity 108, or the trust entity 108 may keep the collateral in the trust entity's 108 cryptocurrency wallet (e.g., if the trust entity 108 previously received the collateral in the trust entity's 108 cryptocurrency wallet).

The systems and method disclosed herein provide multiple benefits over conventional payment transaction settlement implementations and conventional cryptocurrencies. First, instead of having to wait up to several days for payment transactions to settle and clear with conventional intermediaries, the blockchain network 102, its smart contracts 106, and the trust entity computing system 202 allow a merchant to have virtually instant access to funds after a payment transaction from a customer. Second, instead of having to accept payment via a conventional cryptocurrency whose value can fluctuate wildly while waiting for the payment transaction to finalize, the digital stable token's value remains constant, and as mentioned above, the blockchain network 102, its smart contracts 106, and the trust entity computing system 202 allow a merchant to have virtually instant access to funds. Third, consumers who do not have access to banking services (such as a debit card or a credit card) can conduct business using digital stable tokens instead of cash. This helps eliminate the problems associated with using cash, such as having to maintain a large amount of bills that may be bulky, impossible to transfer over long distances, and prone to being lost, stolen, or destroyed.

In one or more embodiments, the systems and methods of the disclosure may improve the functionality of a computer. For example, conventional payment settlement processes use several disparate intermediaries, each with their own computing systems, to interchange data for payment transaction authorization, authentication, and settlement purposes. The data interchange consumes a large amount of network bandwidth. The systems and methods disclosed herein, on the other hand, exchange small blockchain transactions among the nodes of the blockchain network 102, and these peer-to-peer transaction exchanges use much less bandwidth. Furthermore, the blockchain network 102 does not need to wait hours for blockchain transactions to settle as is common with conventional cryptocurrency blockchain networks, which allows users of the blockchain network 102 to burn digital stable tokens and receive a corresponding amount of fiat currency virtually instantly, i.e., within seconds. Also, the stable token does not experience fluctuations in price, which is common for conventional cryptocurrencies, because of the provisioning by the trust entity computing system 202 and its interaction with the blockchain network 102. Furthermore, components of the users' cryptocurrency wallets that transact in the digital stable token, such as two-factor authentication and biometric authentication, in addition to the consensus mechanism of the blockchain network 102, improve the security of the blockchain network 102 over the conventional payment settlement systems.

In further examples of the benefits provided by the disclosure, a user may exchange cryptocurrency for a corresponding amount of digital stable tokens, or exchange digital stable tokens for a corresponding amount of cryptocurrency, via the token cross-chain bridge 708 that bridges the main-chain blockchain network 102 and the side-chain blockchain network 702. These cryptocurrency-digital stable token exchanges execute faster than exchanging cryptocurrency and digital stable tokens through a cryptocurrency exchange 710. Furthermore, by having smart contracts (such as the smart contracts 408 or 804) exchange the cryptocurrency and digital stable tokens at an exchange rate such that the digital smart token is pegged to another asset (such as the U.S. dollar), the value of a digital stable token is stabilized as opposed to conventional cryptocurrencies whose values can fluctuate significantly based on supply and demand.

In one embodiment, the systems and methods of the disclosure may include components, arrangements, or activities that are not routine, well-known, nor conventional. For example, the trust entity computing system 202 being in data communication with the blockchain network 102 via one or more smart contracts 106 is an arrangement not found in conventional payment settlement systems. Instead, conventional settlement systems include issuing banks, acquiring banks, and card network interchange systems. In conventional arrangements, a blockchain user uses a cryptocurrency exchange to exchange cryptocurrencies, whereas the current disclosure includes the token cross-chain bridge 708, the main-chain blockchain network 102, and the side-chain blockchain network 702 as a non-conventional arrangement of these components so that a user can exchange cryptocurrency for digital stable tokens. The smart contracts 106, 706 of each network 102, 702 include behaviors that are unconventional, such as receiving deposit data 406 from a trust entity computing system 202, exchanging cryptocurrency and digital stable tokens in a stabilized manner, and sending instructions 608 to the trust entity computing system 202 to facilitate the deposit of fiat currency.

In some embodiments, a useful analogy for the technology disclosed herein may include imagining the blockchain network 102 to be the equivalent of a virtual payment highway. The blockchain network 102 may include both fiat currency and cryptocurrency on-ramps. The fiat currency on-ramp may include the process depicted in FIG. 4, and the cryptocurrency on-ramp may include the token cross-chain bridge 708. Once the digital stable tokens are on this "highway" of the blockchain network's 102 blockchain, they can be exchanged between different users at an almost negligible cost and virtually instantly. If a user wishes to leave the network, i.e., get off using an off-ramp, the user can use the fiat currency off-ramp (e.g., the process depicted in FIG. 6), or the user can use the cryptocurrency off-ramp (e.g., the token cross-chain bridge 708). Using an off-ramp may include burning the stable tokens involved.

In some embodiments, the described features, structures, or characteristics of the disclosure may be combined in one or more suitable manners. In the description herein, numerous specific details are provided, such as examples of programming, software, user selections, hardware, hardware circuits, hardware chips, or the like, to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

While the disclosure may describe the consumer user or the consumer user device 110 performing certain functions, the merchant user or the merchant user device may also perform these functions, and vice versa. Furthermore, while the disclosure may describe the same smart contract performing certain functions, different smart contracts may perform those functions as well. Also, while the disclosure may describe different smart contracts performing different functions, the same smart contract may also perform those functions.

These features and advantages of the embodiments will become more fully apparent from the following description and appended claims, or may be learned by the practice of embodiments as set forth hereinafter. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of a new and useful SYSTEMS AND METHODS FOR BLOCKCHAIN-BASED TRANSACTION SETTLEMENT, it is not intended that such references be construed as limitations upon the scope of this invention.

What is claimed is:
1. A system, comprising:
a first blockchain network, including
a plurality of nodes, wherein each node of the plurality of nodes includes
a computer processor,
a non-transitory computer-readable storage medium including a plurality of executable instructions, wherein the computer processor, in response to executing the plurality of executable instructions, is configured to execute a first smart contract, a second smart contract, and a third smart contract, and
a copy of a blockchain of the blockchain network,
a trust entity, including a computing device, wherein the computing device includes a computer processor and a non-transitory computer-readable storage medium including a plurality of executable instructions, wherein the computer processor, in response to executing the plurality of executable instructions, is configured to send deposit data to the first smart contract;
a first user device, including a first cryptocurrency wallet, a computer processor and a non-transitory computer-readable storage medium including a plurality of executable instructions executable by the computer processor;
a second user device, including a second cryptocurrency wallet, a computer processor and a non-transitory computer-readable storage medium including a plurality of executable instructions executable by the computer processor;
and a token cross-chain bridge in data communication with the first blockchain network and a second blockchain network, wherein the cross-chain bridge includes one or more bridge nodes, wherein each bridge node of the one or more bridge nodes includes
a computer processor, and
a non-transitory computer-readable storage medium including a plurality of executable instructions;
wherein the first smart contract, in response to being executed by the computer processor of the node of the plurality of nodes of the first blockchain network, is configured to,
receive the deposit data from the trust entity, wherein the deposit data includes a first fiat amount,
transfer a first amount of a digital stable token to the first cryptocurrency wallet, wherein the first amount of the digital stable token corresponds to the first fiat amount;
wherein the computer processor of the first user device, in response to executing the executable instructions of the computer-readable storage medium, is configured to send a second amount of the digital stable token from the first cryptocurrency wallet to the second cryptocurrency wallet;
wherein the computer processor of the second user device, in response to executing the executable instructions of the computer-readable storage medium, is configured to send a third amount of the digital stable token from the second cryptocurrency wallet to the second smart contract;
wherein the second smart contract, in response to being executed by the computer processor of the node of the plurality of nodes of the first blockchain network, is configured to transmit an instruction to the computing device of the trust entity;
wherein the computer processor of the computing device of the trust entity, in response to executing the executable instructions of the computer-readable storage medium, is configured to, in response to receiving the instruction, transfer a second fiat amount to an account of a user of the second user device, wherein the second fiat amount corresponds to the third amount of the digital stable token;
wherein the computer processor of the first user device is further configured to send a side-chain blockchain transaction to a fourth smart contract of the second blockchain network, the side-chain blockchain transaction including a first amount of cryptocurrency;
wherein the processor of each of the one or more bridge nodes, in response to executing the plurality of executable instructions of the computer-readable storage medium, is configured to
receive a first notification from the fourth smart contract, wherein the notification includes the first amount of cryptocurrency, and
send a second notification to the third smart contract, wherein the second notification includes a fourth amount of the digital stable token, wherein the fourth amount of the digital stable token corresponds to the first amount of cryptocurrency; and wherein the third smart contract, in response to being executed by the computer processor of the node of the plurality of nodes of the first blockchain network, is configured to send the fourth amount of the digital stable token to the first cryptocurrency wallet.

2. The system of claim 1, wherein:

the first blockchain network includes a main-chain blockchain network; and the second blockchain network includes a side-chain blockchain network.

3. The system of claim 2, wherein the third smart contract being configured to send the fourth amount of the digital stable token to the first cryptocurrency wallet includes the third smart contract, in response to being executed by the computer processor of the node of the plurality of nodes of the first blockchain network, being configured to mint the fourth amount of the digital stable token.

4. The system of claim 2, wherein the third smart contract, in response to being executed by the computer processor of the node of the plurality of nodes of the first blockchain network, is further configured to:

receive a fifth amount of the digital stable token from the first user device; and send a third notification to the token cross-chain bridge, the third notification including the fifth amount of the digital stable token.

5. The system of claim 1, wherein:

the first smart contract, in response to being executed by the computer processor of the node of the plurality of nodes of the first blockchain network, is further configured to mint the first amount of the digital stable token in response to receiving the deposit data from the trust entity; and the second smart contract, in response to being executed by the computer processor of the node of the plurality of nodes of the first blockchain network, is further configured to burn the third amount of the digital stable token in response to receiving the third amount of the digital stable token, wherein burning the third amount of the digital stable token includes sending the third amount of the digital stable token to a dead-end cryptocurrency wallet.

* * * * *